1,861,712

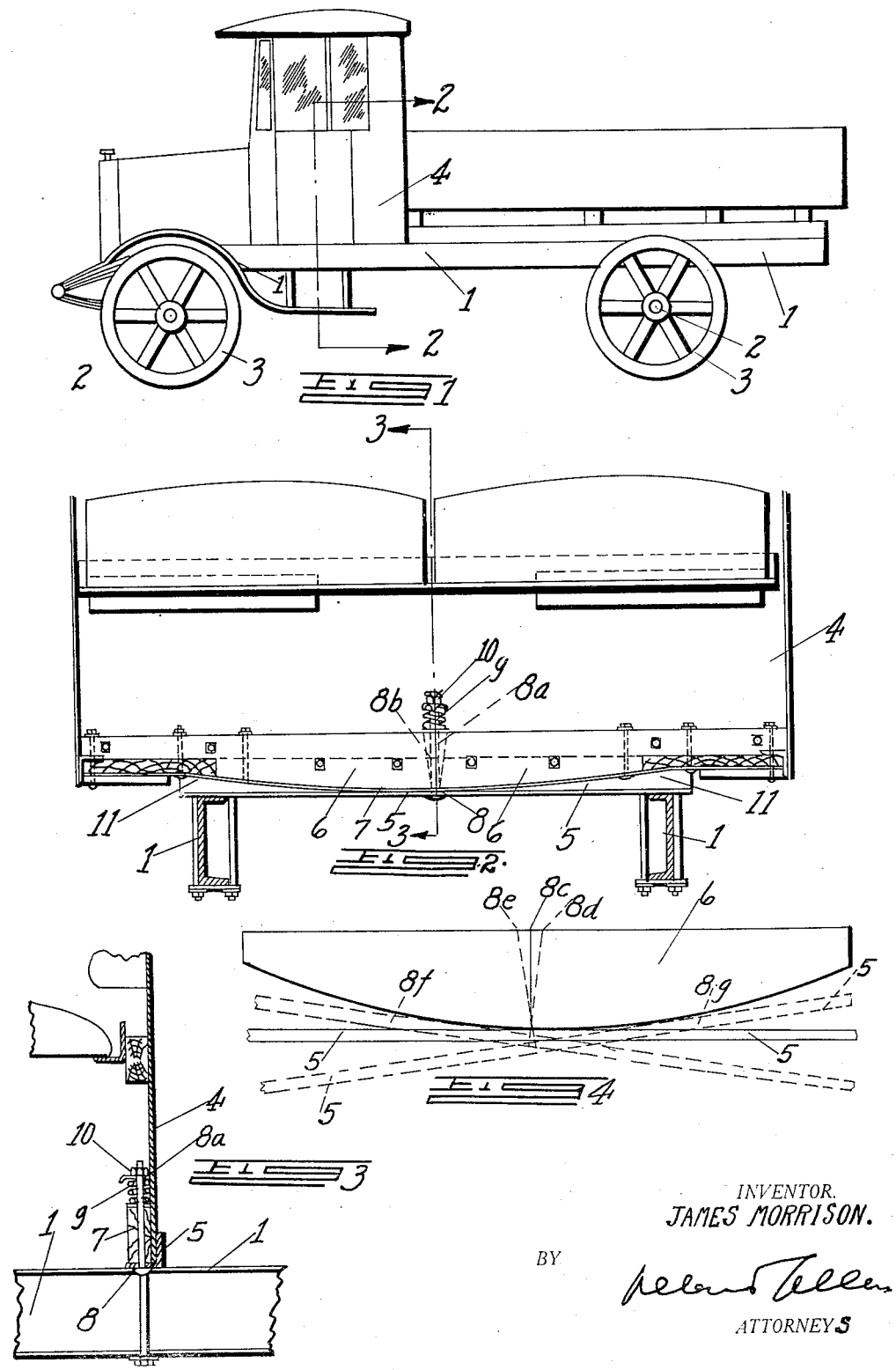
June 7, 1932. J. MORRISON 1,861,712
VEHICLE AND METHOD OF MOUNTING BODIES ON CHASSIS
Filed May 5, 1927
INVENTOR.
JAMES MORRISON.
BY
ATTORNEYS Patented June 7, 1932

UNITED STATES PATENT OFFICE

JAMES MORRISON, OF CINCINNATI, OHIO, ASSIGNOR TO THE HIGHLAND BODY MANUFACTURING COMPANY, OF CINCINNATI, OHIO, A CORPORATION OF OHIO

VEHICLE AND METHOD OF MOUNTING BODIES ON CHASSIS

Application filed May 5, 1927. Serial No. 189,138.

My invention specifically relates to methods of mounting cabs on automobile and vehicle chassis and particularly on automobile truck chassis having elongated bodies.

There are what might be called two schools of chassis construction, one which believes that the chassis frame and body should be braced crosswise of the frame in a rigid manner to prevent any twisting movement of the chassis during movement of the vehicle over uneven surfaces. The other school believes that the chassis should be substantially rigid longitudinally but that all cross bracing should permit the chassis to twist with movement of one side of the truck into a depression or with other movement which causes one side to be raised to a higher position than the other.

It is particularly my object to provide a suitable method for mounting a cab on the latter type of truck chassis, but even in the most rigid frames, this twisting action cannot be entirely avoided when the vehicle passes over very uneven surfaces, and so my invention may be utilized for both types of construction.

As is well known, the principal support for the bodies, cabs, motors, etc., on truck chassis is what is known as the chassis frame consisting of a pair of steel channels which run longitudinally of the frame and with the cross members form the complete frame. It will be obvious that when the truck passes over uneven ground, the wheels on one side or the other will sink down, and with the sinking the steel channel nearest to that side will be subject to a tendency to also sink down. Such a strain will cause the channels to have a twisting movement. Now if a cab or body is mounted rigidly to the channels, the cab will also be subject to the same twisting strain. As a result, the windows and doors are bent out of shape, and there is constant strain on the attachments with which the cab is mounted on the chassis.

It is broadly my object to so mount a cab that the twisting strain on the cab will be avoided. To accomplish this, the preferred method which I employ is to rigidly mount the cab to the channels at the front by bolting to the truck dash and to allow rocking movement of the chassis frame under the cab at the back.

In the drawing:—

Figure 1 is a side elevation of a truck chassis with a cab attached in accordance with my preferred method.

Figure 2 is a section along the line 2—2 in Figure 1, on a slightly enlarged scale.

Figure 3 is a sectional view along the lines 3—3 of Figure 2.

Figure 4 is a diagram illustrating the rocker principle involved in my preferred structure.

Generally indicated in Figure 1 is a truck having an elongated body. The side members of the chassis frame are the two steel channels indicated at 1. The front and back axles are indicated at 2 with the wheels for providing a rolling support indicated at 3. The engine and mechanism for driving the truck are not indicated as their position will be indicated by the view in Figure 1, and they form no part of my invention.

With the movement of the channels with the relative movement upwardly or downwardly of one or the other side of the truck, there is a central pivotal line extending longitudinally through the chassis at about the median line both from the top and from the side. The movement of the channels will pivot or rock up and down with this line substantially the axis of movement. It is my object to provide a rocker support for the rear end of the cab, such as is indicated at 4, and to employ means to retain the rear end of the cab in an evenly balanced position with relation to a central line, so that with the twisting movement of the channels, the sides of the cab at the back will not move, and the strain which would be present if the back were fixed to the frame will be avoided.

Referring to Figure 2, it will be noted that there is a cross bar 5 which I provide for attachment to the longitudinal channels for mounting the cab. The base of the cab which I have indicated at 6 is provided with a curved member 7 extending in a sloping direction upwardly toward the sides of the cab and with the central point 8 resiliently held down by a spring. At the center 8 of the curved member, I secure the curved member 7 to the cross brace 5 with a bolt 8a. It is also preferable, I find, to extend the bolt through a slot 8b tapered laterally on the base 6 of the cab, and to provide a spring 9 and nut 10 on the threaded end of the bolt which makes a resilient connection between the cab and chassis. The upstanding flange of the angle bar 5 engages the member 7 in all positions thereof.

It might be thought that such a structure and method of attachment would allow the cab to sway sideways with the movement of the truck, but I find that the opposite effect is gained. In driving over rough roads there is much less vibration to the cab than I have formerly noted even though the chassis channels are not being subjected to a twisting strain.

The front of the cab is mounted rigidly to the channels in the customary manner and the bracing thus provided for the cab in front holds it in a substantially immovable position in back which is exactly the result which I have sought to attain.

A quite obvious alternative structure may be provided by securing a cross bar 5 to the longitudinal channels which has a curved bearing surface disposed oppositely to that shown. In such a case the base of the cab may be flat, but the point of resilient attachment will be at the center as in the preferred structure illustrated.

In Figure 4 I have shown diagrammatically the relative position of the parts 5 and 6 during twisting movements of the chassis frame. With the channels 1 horizontal, the line 8c representing the bolt 8a will be vertical. As the bar 5 tilts with relation to the curved member 6, the fulcrum of support changes from a position such as 8f on one side to a position such as 8g on the other. The pin 8a will also change from the slanting position 8d to the position 8e. It will be apparent that the moment the bar 5 rocks to the right or left, the spring 9 will tend to pull the parts back to a balanced position with the fulcrum at the position 8. This principle of support I find preferable to a pivot support at the center as a true pivot bearing would tend to raise and lower the plane of support for the base of the cab with rocking movement, while my rocker support avoids this and its consequent strain on the cab.

Other modification by which the same result may be achieved will readily occur to those skilled in the art without departing from the principle of my invention. I may further provide shock absorbers in the intervening space between the curved base of the cab and the cross bar at the sides in the positions indicated at 11.

In the claims which follow I shall define the mounting of the back of the cab as a rocker mounting by which I limit myself to a mounting similar to the rockers of a cradle in which a convex bearing member has its point of bearing move from side to side with the rocking movement of the frame under the cab as distinguished from a pivotal lateral support having a fixed axial position.

Having thus described my invention what I claim as new and desire to secure by Letters Patent is:—

1. In combination with the chassis of a motor truck, the front and rear pairs of wheels supporting said chassis, a cab for the truck having its front end rigidly mounted on the chassis close to the front pair of wheels where twisting of the chassis due to variations of its support by said wheels is negligible, a rocker mounting for the back of said cab on a part of said chassis intermediate of said front and rear pairs of wheels where said twisting of said chassis is appreciable, said rocker mounting comprising a transverse element on the chassis and a transverse element on the lower part of the back of said cab having a longitudinally convex lower surface bearing against the upper surface of the element on the chassis, whereby said elements have a rolling contact with each other, so that upon said twisting of the chassis the structure of the cab is relieved of strain with a minimum of vibration of said cab relative to said chassis.

2. In combination with the chassis of a motor truck, the front and rear pairs of wheels supporting said chassis, a cab for the truck having its front end rigidly mounted on the chassis close to the front pair of wheels where twisting of the chassis is negligible, a rocker mounting for the back of said cab on a part of said chassis where twisting of the chassis is appreciable, comprising a transverse element on the chassis and a transverse element on the lower part of the back of the cab, one of said elements having a longitudinally convex surface bearing against a surface of the other element whereby said elements have rolling contact with each other, so that, upon twisting of the chassis due to variations of its support by said wheels, the structure of the cab is relieved of strain with a minimum of vibration of said cab relative to said chassis.

JAMES MORRISON.